United States Patent [19]

Welbourn et al.

[11] Patent Number: 5,262,000
[45] Date of Patent: Nov. 16, 1993

[54] METHOD FOR MAKING MICROMECHANICAL SWITCH

[75] Inventors: Anthony D. Welbourn; Judith C. McLaughlin, both of Ipswich, England

[73] Assignee: British Telecommunications Public Limited Company, London, England

[21] Appl. No.: 842,346
[22] PCT Filed: Sep. 7, 1990
[86] PCT No.: PCT/GB90/01391
 § 371 Date: Mar. 20, 1992
 § 102(e) Date: Mar. 20, 1992
[87] PCT Pub. No.: WO91/05284
 PCT Pub. Date: Apr. 18, 1991

[30] Foreign Application Priority Data

Sep. 26, 1989 [GB] United Kingdom ............... 8921722

[51] Int. Cl.$^5$ ............... H01L 21/306; B44C 1/22; C03C 15/00
[52] U.S. Cl. ............... 156/643; 29/622; 156/653; 156/656; 156/657; 156/659.1; 156/662; 437/182
[58] Field of Search ............... 156/626, 633, 643, 652, 156/653, 656, 657, 659.1, 662; 29/622, 885; 437/182, 228, 238, 245; 200/52 R, 61.7, 400

[56] References Cited

U.S. PATENT DOCUMENTS 4,566,935 1/1986 Hornbeck ............... 156/626
4,624,741 11/1986 Daniele ............... 156/645
4,674,180 6/1987 Zavtacky et al. ............... 29/622
4,783,237 11/1988 Aine et al. ............... 437/15
4,805,038 2/1989 SeLigson ............... 358/296
4,849,070 7/1989 Bly et al. ............... 156/643

FOREIGN PATENT DOCUMENTS 0330105 8/1989 European Pat. Off. .

OTHER PUBLICATIONS

International Electron Devices Meeting 1986, Los Angeles pp. 184–187; S. Sugiyama: "Micro-diaphragm pressure sensor".

*Primary Examiner*—William A. Powell
*Attorney, Agent, or Firm*—Nixon & Vanderhye

[57] ABSTRACT

A micromechanical switch is formed using a first sacrificial layer formed on a substrate. A second sacrificial layer is then formed as an island on the first sacrificial layer. A switch element layer of resilient material is then formed on the second sacrificial layer, and the outline of a switch element is defined on the switch element layer. The outline of a window is then defined, and the second sacrificial layer is etched through the window using an etchant which laterally undercuts that portion of the switch element layer which is to form the switch element. The first sacrificial layer is then etched through the window defined by the etched second sacrificial layer to define a cavity beneath said portion, thereby defining the switch element.

29 Claims, 4 Drawing Sheets

METHOD FOR MAKING MICROMECHANICAL SWITCH

This invention relates to a micromechanical switch, and to a method of making such a switch. In particular, the invention is concerned with the fabrication of micromechanical beams, bridges and torsion elements for use in optical switches and modulators.

Silicon based micromechanical switches, which incorporate micromachined deflecting beams, bridges or torsion elements (switch elements) are known. Typically, this type of device is formed by etching a switch element from monocrystalline silicon, the etching process being such as to form a cavity or well beneath the switch element. Electrodes are then added (or formed in the monocrystalline silicon) for controlling the switch element. When making mirror switches or modulators, the surface of the switch element is provided with a coating of reflective metal. Such switches offer significant advantages compared with conventional switches, these advantages arising from their small size, fast response and negligible aging effects. Moreover, they can be manufactured by techniques that are compatible with standard integrated circuit (IC) processing methods, and so offer the potential of batch processing and of integration with associated electronic circuitry.

For some optical switching applications, it is advantageous to use larger switch elements than those which can be made by known micromachining techniques (typically 30–75 $\mu$m). Unfortunately, fabrication problems arise as the size of the switch element is increased. Thus, if the switch element has a dimension greater than 300 $\mu$m, a very high degree of etching selectively is required. This is because the region to be protected from etching is coated with an etch-resistant masking layer as thin as 0.1 to 0.2 $\mu$m, and the material beneath the switch element (which is to be undercut) must be completely eroded. This calls for a long over-etch, which needs a selectivity of more than 3000:1 between the undercut region and the etch mask. To give some idea of this constraint, $Si_3N_4$ is usually used as a protective mask against the usual oxide etchant (buffered HF), but the $Sio_2$: $Si_3N_4$ etch ratio is only 50:1. Similarly, where an anisotropic Si etchant is used to etch {100} planes quickly, whilst "etch-stopping" on {111} planes, selectivity is typically 50:1 for ethylene diamine pyrocatechol (EDP) and water and between 100: 1 and 300:1 for KOH.

Moreover, it is important that the edges of the cavity formed beneath the switch element are well defined during the undercut etching process. Thus, if an undercut of several hundred $\mu$m is to be formed (which is necessary for large area switch elements), a lateral etch stop layer is required around the cavity edges to prevent the cavity being enlarged by several hundred $\mu$m per side. Since some enlargement is tolerable, a selectivity of greater than 100:1 is adequate here. However, even this degree of etch selectivity is difficult to achieve.

Another problem that can arise with the manufacture of mirror switches/modulators is that the metal reflectivity can be affected by the etching process. In order to overcome this problem, the metal may be passivated (i.e. coated with non-etching material) prior to the deep undercut etch step. This passivating layer must be formed by a low temperature process to avoid thermal damage to the metal film and stress damage to the switch element. Unfortunately, low temperature passivating layers have a poor etch resistance, so it is difficult to prevent the metal reflectivity being affected.

When the switch element of such a pattern is controlled electronically, very high voltages may be required in which case it is important to obtain good isolation/breakdown strength between the control electrodes. If the switch element is a torsion element, this is very difficult to achieve monolithically. Furthermore, it is difficult to prevent the torsion bars of such a torsion element from deflecting under the forces used to control the element.

The aim of the invention is to provide a method of making micromechanical switches which does not suffer from these problems.

The present invention provides a method of making a micromechanical switch, the method comprising the steps of:

a) forming a first sacrificial layer on a substrate;

b) forming a second sacrificial layer as an island on the first sacrificial layer;

c) forming a switch element layer of resilient material on the second sacrificial layer;

d) defining the outline of a switch element on the switch element layer;

e) defining the outline of a window;

f) etching an aperture in the second sacrificial layer through the window using an etchant which laterally undercuts that portion of the switch element layer which is to form the switch element; and g) etching the first sacrificial layer through the aperture in the etched second sacrificial layer to define a cavity beneath said portion.

Advantageously, the first sacrificial layer is an oxide layer formed by deposition or thermal growth, and the second sacrificial layer is a polysilicon layer formed be deposition. Preferably, the second sacrificial layer has a thickness which is small compared with that of the first sacrificial layer is substantially 10 $\mu$m, and the thickness of the second sacrificial layer is between 0.5 and 2 $\mu$m.

The method may further comprise the step of forming a nitride layer on the second sacrificial layer prior to the formation of the switch element layer, the nitride layer having a thickness of between 0.1 and 0.4 $\mu$m.

Preferably, the switch element layer is doped polysilicon which is formed by deposition, the thickness of the switch element layer being between 0.5 and 2 $\mu$m.

Advantageously, the outline of the switch element is defined photolithographically, and the switch element is formed by etching the switch element layer selectively to the nitride layer. Conveniently, the switch element layer is etched using a plasma etch.

A further nitride layer may be deposited following the step of etching the switch element layer, the further nitride layer having a thickness of between 0.1 and 0.3 $\mu$m. The method may further comprise the step of forming a layer of metal on that portion of the further nitride layer which covers the switch element. The method may further comprise the step of forming a passivating layer over the layer of metal.

The outline of the window may be formed photolithographically on the passivating layer. Preferably, the passivating layer is etched, through the window, using a buffered HF etchant. Both nitride layers may then be etched, using the etched passivating layer as a mask, using orthophosphoric acid as the etchant. Alternatively, the passivating layer and both the nitride layers are etched, through the window, by a single plasma etching step. Advantageously, the plasma etching step uses $CHF_3$ as the etchant.

The invention may further comprise the step of forming a further layer of metal over part of the passivating layer and part of the first sacrificial layer, the further layer of metal being formed prior to etching the passivating layer. Preferably, the further layer of material is formed by electroplating and has a thickness of between 3 and 4 μm.

Advantageously, the second sacrificial layer is etched using EDP as the etchant, and the first sacrificial layer is etched using a buffered HF etchant.

The method may further comprise the step of forming one or more electrodes in the substrate prior to the formation of the first sacrificial layer.

The invention also provides a micromechanical switch whenever made by the method described above.

BRIEF DESCRIPTION OF THE DRAWINGS

The invention will now be described is greater detail, by way of example, with reference to the accompanying drawings, in which:

Referring to the drawings, FIG. 1 shows an intermediate stage in the basic process for fabricating an micromechanical switch. A first relatively-thick sacrificial layer S1 is formed on a silicon substrate S, the substrate containing one or more lower electrodes (not shown). A second, relatively-thin sacrificial layer S2 is then formed on the first sacrificial layer S1. A cantilever beam layer S3 is then formed on the layer S2. This stage of the process is shown in FIG. 1. The layer S2 is then removed (using a suitable etchant) from beneath that portion of the layer S3 which is to form a cantilever beam B by a long undercut (see FIG. 2). A cavity C is then etched in the layer S1 through the cavity formed in the layer S2. The deep cavity C is, therefore, etched in a time related to the thickness of the layer S1, rather than to the depth of undercut. The requirements for very high etch-rate selectivity and very thick layers are, thus, separated into two different materials.

FIGS. 4 to 6 show various stages of the fabrication process of a practical device. Thus, FIG. 4 shows an intermediate stage in the fabrication process of an optical micromechanical switch. The starting point for the process according to the invention is a monocrystalline silicon substrate 1. A lower electrode 2 is formed in the substrate 1 by a diffusion process in which is a heavily-doped region defines the lower electrode. The heavily-doped region may be p+ (in which case boron is used as the dopant) or n+ (in which cases arsenic or phosphorus is used as the dopant).

Figure 1:
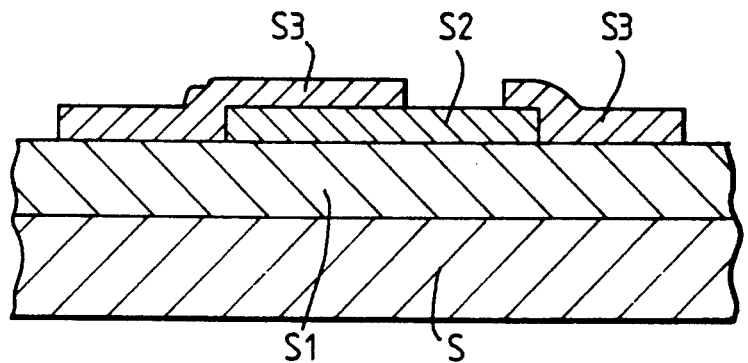
FIGS. 1 to 3 are schematic longitudinal cross-sections which illustrate the basic process sequence of the fabrication method of the invention.

A thick (~10 μm) sacrificial oxide layer 3 is thermally grown on the substrate 1, after which a thin (0.5 to 2.0 μm) sacrificial polysilicon layer 4 is deposited by a chemical vapour deposition (CVD) process. Using a photolithographic technique, the outline 5 (see FIG. 4) of a cavity (to be described below) is then printed onto the thin sacrificial layer 4 (see FIG. 4). The outline of the cavity is then defined by etching the polysilicon layer 4 using a plasma etching or a wet etching process. The layer 4 is then covered with a protective nitride layer 6, this layer being deposited by a CVD process—either plasma enhanced CVD (PECVD) or low pressure CVD (LPCVD)—to a depth of 0.1 to 0.4 μm. The layer 6 acts to protect the underside of a layer 7 which is subsequently added.

The layer 7 is a doped polysilicon layer which is deposited by CVD to a depth of 0.5 to 2.0 μm. The layer 7 is doped either p+ or n+, so that this layer can act as an electrode (as described below). the doping of the layer 7 also anneals the polysilicon, thereby relieving stress in this layer. The pattern of a cantilever beam 8 (see FIG. 4) is then printed on the layer 7 by a photolithographic process, and the polysilicon is etched away using a plasma etch to define the shape of the beam. The plasma etch is a selective etch which terminates at the nitride layer 6.

Figure 4:
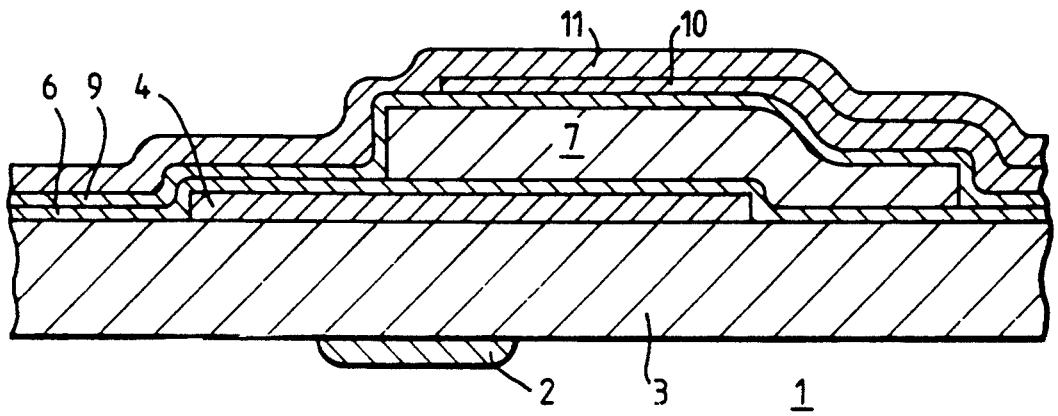
FIGS. 4 to 6 are diagrammatic longitudinal cross-sections through a practical device constructed in accordance with the invention at various stages of fabrication.
Figure 5:
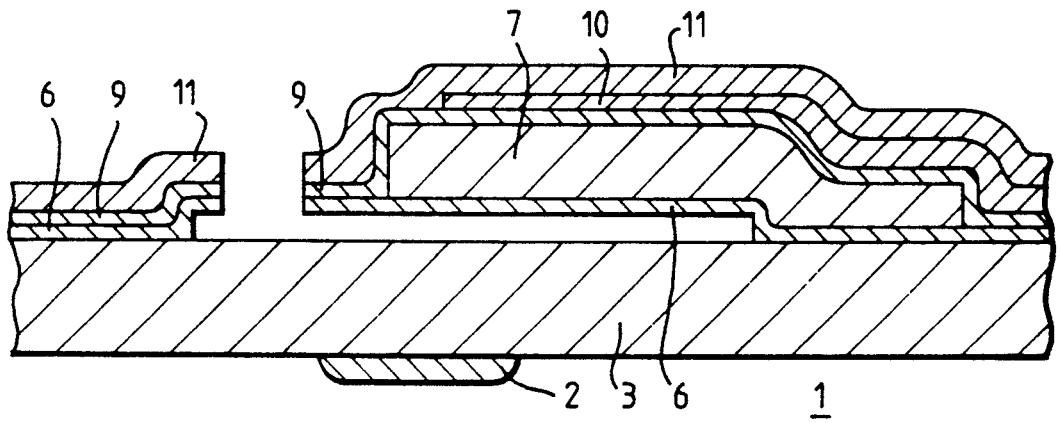
Figure 6:
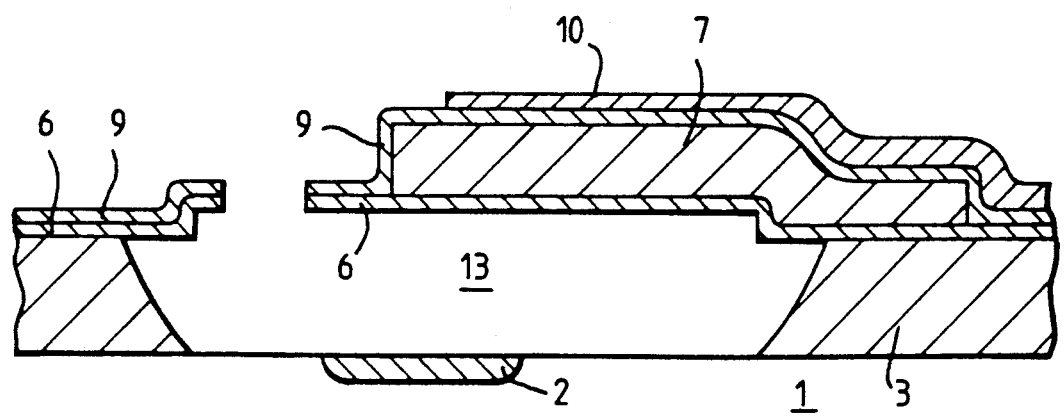

A second nitride layer 9 is then deposited conformally by CVD, this layer having a thickness of 0.1 to 0.3 μm and acting to protect the top and sides of the beam 8. The conformal deposition of this layer 9 is necessary to ensure adequate protection for the sides of the beam 8. A thin layer 10 of aluminium is then deposited over the layer 9 by evaporation or sputtering. This layer 10 is to constitute both an upper electrode and a mirror surface. The layer 10 must be a thin layer (50 nm to 0.2 μm) to reduce the stress on the beam 8 which is to be formed out of the polysilicon layer 7. However, a minimum thickness of 0.5 μm of metal is needed in those regions where contact wires for the upper electrode are to be bonded to the layer 10. In practice, therefore, a thick (0.5 μm) layer is aluminium is deposited over the entire area of the device, and aluminium is subsequently removed by plasma etching, following a photolithographic printing step, everywhere except those contact regions and any necessary wiring tracks. A passivating layer 11, which acts to protect the layer 10 from subsequent processing steps, is then deposited. This layer 11 is a 0.5 μm conformal, low temperature oxide coating which is formed by PECVD. FIG. 4 illustrates the device at this stage of the fabrication process.

Figure 2:
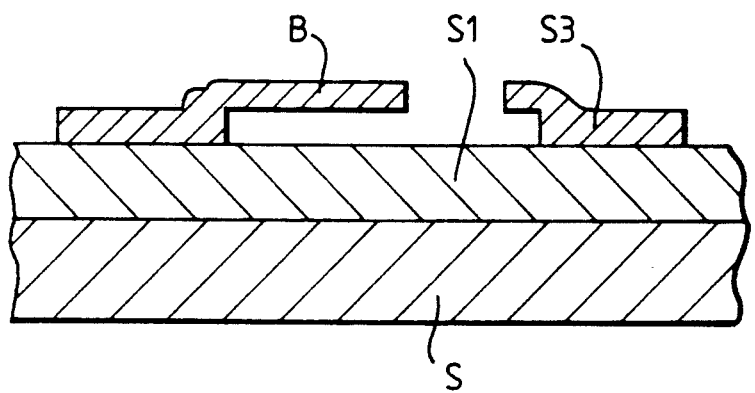
Figure 3:
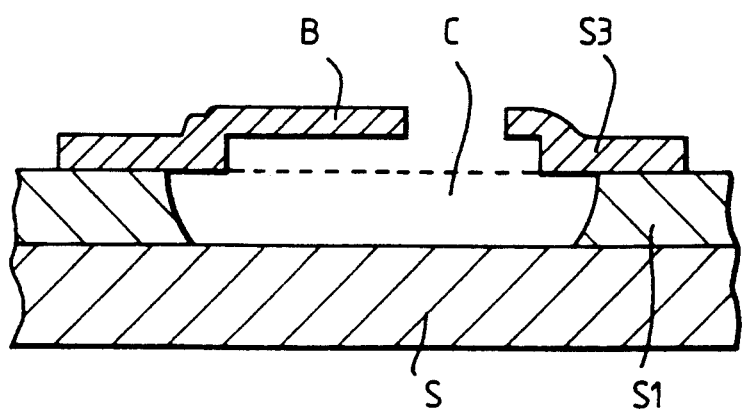
Figure 7:
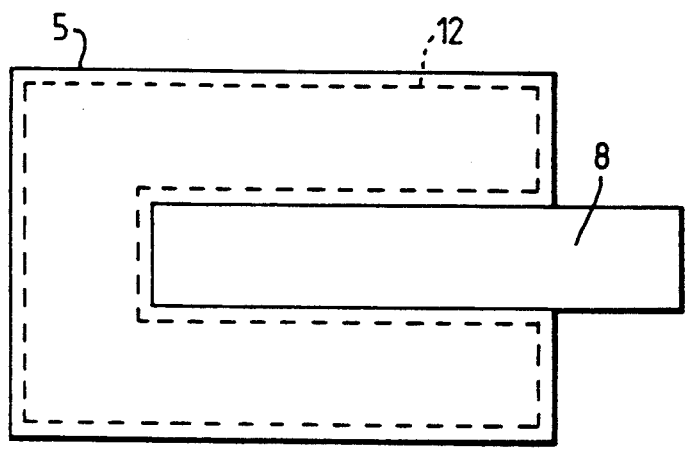
FIG. 7 is a diagrammatic plan view of the device at an intermediate stage of fabrication.

The outline 12 (see FIG. 7) of an etch window, which is to open up a cavity 13 (to be described below) whilst protecting the cantilever beam 8, is then formed by a photolithographic technique on the passivating layer 11. The passivating layer 11 is then etched away within the outline 12 using a buffered HF etchant. The nitride layers 6 and 9 are subsequently etched, within the outline 12, using the passivating layer as a mask and orthophosphoric acid as the etchant. The thin sacrificial layer 4 is then etched using EDP as the etchant. This etching step undercuts the polysilicon of the layer 4 beneath the cantilever beam 8. It should be noted that, in EDP, the etching selectivity of polysilicon to nitride is >6000:1, and the etching selectivity of polysilicon to passivating oxide is >2500:1. FIG. 2 illustrates the device at this stage of the fabrication process.

The cavity 13 is then formed by etching the thick sacrificial layer 3 using buffered HF. This etching step also strips away the passivating layer 11. In buffered HF, the etching selectivity of oxide to nitride is >50:1. The etching time is virtually independent of the area of the cavity 13, depending only on the thickness of the layer 3, because the etchant can immediately penetrate fully under the cantilever beam 8. The sidewells of cavity 13 are under cut by a distance approximately equal to the depth of the cavity.

Figure 8:
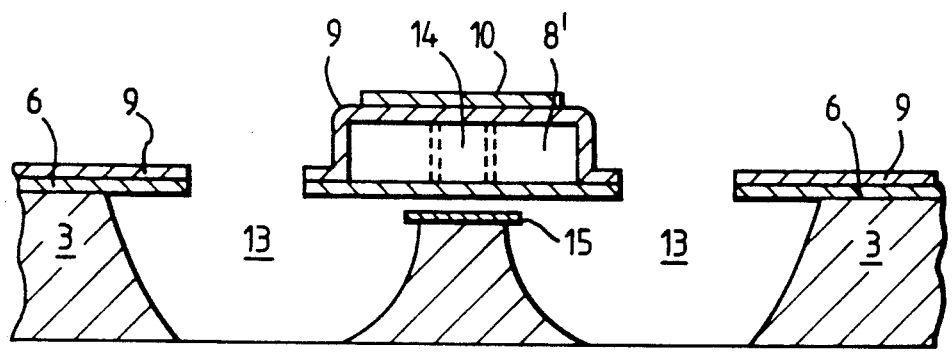
FIG. 8 is a diagrammatic transverse cross-section through the finished version of a device which is a modified version of the device of FIGS. 1 to 4.

If a switch having a torsion element is required, the fabrication process described above with reference to FIGS. 4 to 7 could be modified. Thus, in order to define a torsion element rather than a cantilever beam, the outline of the etch window would be modified to define a pair of torsion bars 14 (see FIG. 8) extending transversely, in opposite directions, from the central region of the torsion element 8'. Moreover, an additional nitride layer 15 would be formed (between the steps, forming the two sacrificial layers 3 and 4) beneath the regions in which the torsion bars 14 are to be formed. In this region, only the thin sacrificial layer 4 is removed in the etching steps which forms the cavity 13, and the resultant pillar (see FIG. 8) forms a support for the torsion element 8', thereby minimising bending of the element.

Figure 9:
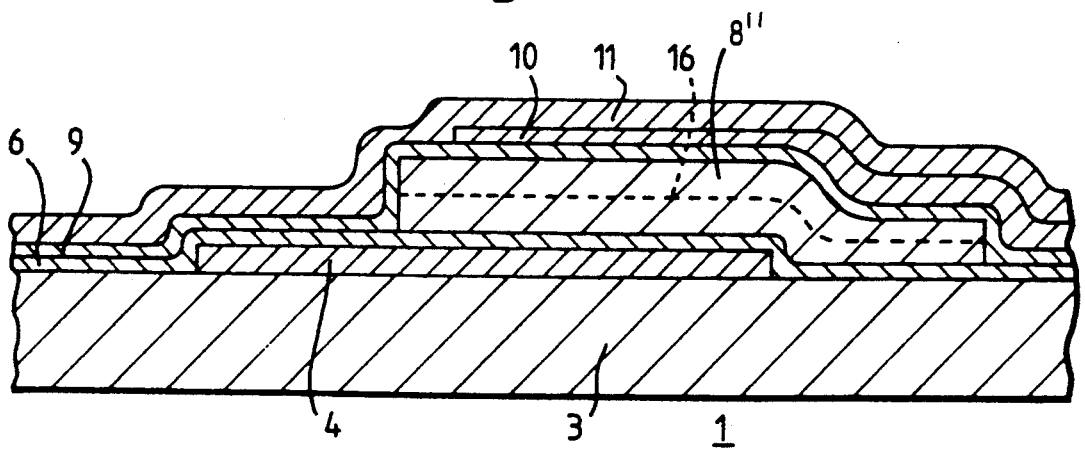
FIG. 9 is a diagrammatic cross-section, similar to that of FIG. 1, of a modified form of device.

FIG. 9 shows an intermediate stage (equivalent to FIG. 4) in the fabrication of another form of modified device, which incorporates a cantilever beam 8". The beam 8" is a multi-layer beam which incorporates a piezoelectric layer 16. The beam 8" thus constitutes a piezoelectric bimorph actuator, the deflection of which is controlled by the electric field within the piezoelectric layer 16.

Figure 10:
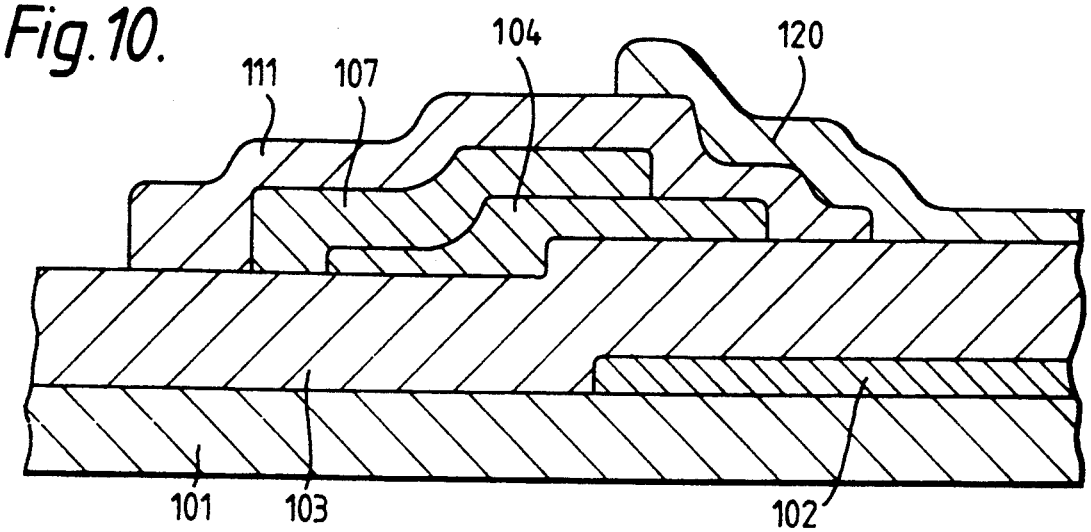
FIGS. 10 to 12 are diagrammatic longitudinal cross-sections through an electrical switch device constructed in accordance with the invention at various stages of fabrication.
Figure 11:
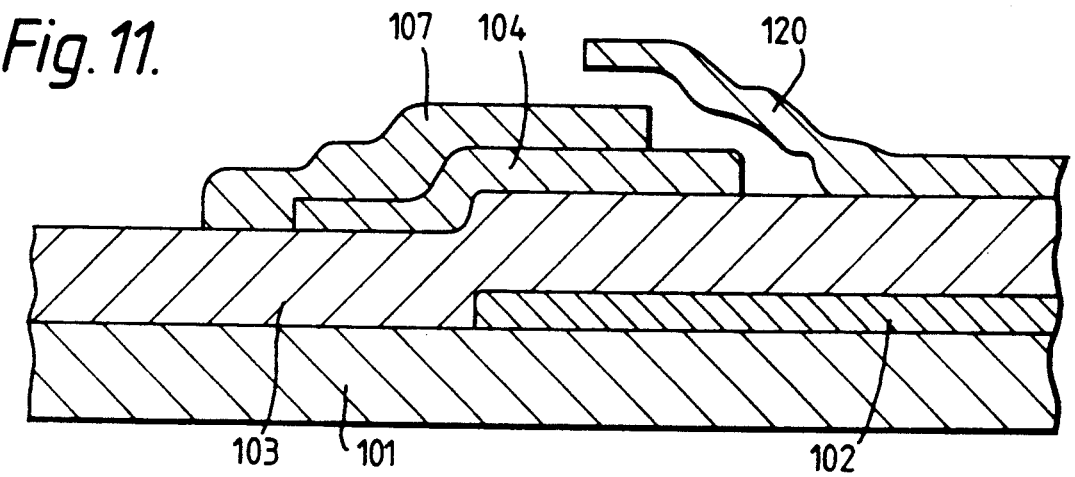
Figure 12:
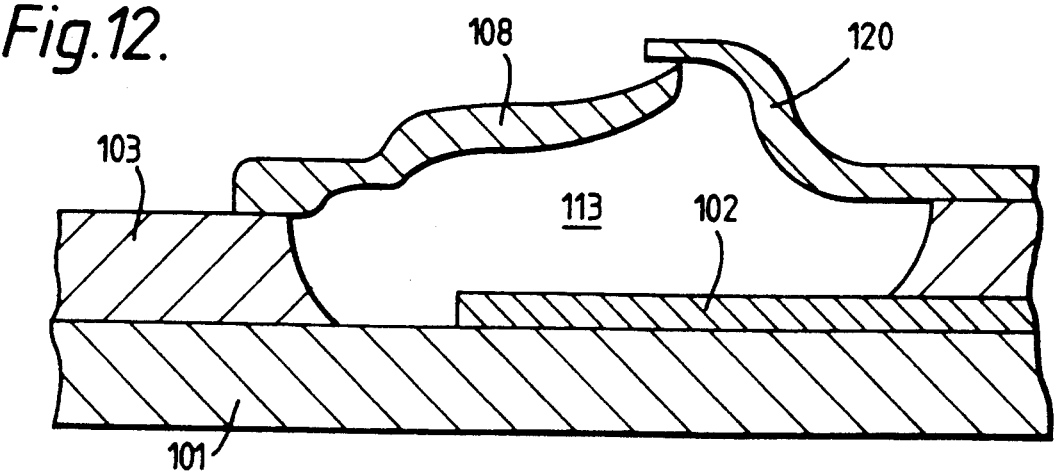

FIGS. 10 to 12 show how the fabrication process of the invention can be modified to make an electric micromechanical switch. A most of the process steps are similar to those of the process described above with reference to FIGS. 4 to 6, only the modified steps of the process of FIGS. 10 to 12 will be described in detail and similar reference numerals (with the addition of 100) will be used for similar parts. Thus, a lower electrode 102 is deposited (for example by sputtering a refractory metal) on a monocrystalline silicon substrate 101. Thick and thin sacrificial layers 103 and 104 respectively are then formed, after which a switch element layer 107 is formed. This layer 107 is a conducting layer, which is to form a cantilever beam switch element 108 (see FIG. 12), made for example of doped polysilicon or metal. This layer could also be an insulating layer coated top and bottom with metal. A third sacrificial (oxide) layer 111 is deposited by PECVD, this layer acting as a passivating layer and having a thickness of between 1 and 2 μm. A 3 to 4 μm thick metal layer 120 is then formed, by electroplating, over part of the layer 111 and over part of the layer 103. This stage of the process is shown in FIG. 10.

The sacrificial layer 111 is then etched out using a buffered HP etchant to leave a gap between the layer 107 and the layer 120 (see FIG. 11). The remaining steps of the process are similar to the final process steps described above with reference to FIGS. 4 to 6, and relate to the formation of the beam 108 and the cavity 113. FIG. 12 shows the finished electric micromechanical switch, in which the beam 108 curves naturally upwards so as to make electrical contact with the layer 120. This curve is formed as a result of an upward bending movement imparted to the beam 108 due to intrinsic stresses formed in the beam by the use of two different materials. The beam 108 can then be controlled electrostatically, using the lower electrode 102, to make or break electrical contact between the beam and the layer 120, thus forming a one-way switch. A two-way switch could be formed by providing a further electrode within the cavity 113. Alternatively, the beam 108 would be a piezoelectric bimorph element, which could be bent both upwardly and downwardly to make contact with the lower electrode 102 and the layer 120 (upper electrode).

The micromechanical switch fabrication process described above has the following advantages:

1. It offers complete flexibility in the placement of electrodes on the base of the cavity and on the switch element, so it is adaptable to torsion elements and bridges, as well as cantilever beams.
2. It allows the enlargement of the cavity 13 to be easily controlled compared with methods using a single sacrificial layer (which requires a very deep etch which would give problems with later step coverage).
3. It does not require an epitaxial growth step.
4. The required etch selectivities can all be achieved with materials which are readily available.
5. It could be used for both normally-open and normally-closed electrical switches.
6. It intrinsically give a multi-layer cantilever allowing stresses to be compensated.

It will be apparent that the fabrication process described above could be modified in a number of ways. For example, the lower electrode could be formed by the deposition of a refractory metal or by ion implantation. Where a single lower electrode 2 is required, the entire substrate 1 could be doped (either $n^+$ or $p^+$). It would also be possible, for example where a torsion element constitutes the switching element, to provide a pair of lower electrodes. It would also be possible to deposit the thick sacrificial oxide layer 3 by, for example, PECVD, particularly if a metal electrode 2 is utilised. Instead of forming the beam 8 (switch element) from a polysilicon layer 7, this layer would be $SiO_2$ deposited by, for example, PECVD. Moreover, the metal used for the electrode/mirror 10 would be gold instead if aluminium. In this case, there would be no need for the subsequent formation of the passivating layer 11. Where a passivating layer 11 is necessary, this could alternatively be a nitride layer. As an alternative to using two etching steps to etch the passivating layer 11 and the two nitride layers 6 and 9, these layers would be etched in a single plasma etching step using, for example, $CHF_3$.

We claim:
1. A method of making a micromechanical switch, the method comprising the steps of:
   a) forming a first sacrificial layer on a substrate;
   b) forming a second sacrificial layer as an island on the first sacrificial layer;
   c) forming a switch element layer of resilient material on the second sacrificial layer;
   d) defining the outline of a switch element on the switch element layer;
   e) defining the outline of a window;
   f) etching an aperture in the second sacrificial layer through the window using an etchant which laterally undercuts that portion of the switch element layer which is to form the switch element; and g) etching the first sacrificial layer through the aperture in the etched second sacrificial layer to define a cavity beneath said portion.

2. A method as claimed in claim 1, wherein the first sacrificial layer is an oxide layer formed by deposition or thermal growth.

3. A method as claimed in claim 1, wherein the second sacrificial layer is a polysilicon layer formed by deposition.

4. A method as claimed in claim 1, wherein the second sacrificial layer has a thickness which is small compared with that of the first sacrificial layer.

5. A method as claimed in claim 4, wherein the thickness of the first sacrificial layer is substantially 10 μm, and the thickness of the second sacrificial layer is between 0.5 and 2 μm.

6. A method as claimed in claim 1, further comprising the step of forming a nitride layer on the second sacrificial layer prior to the formation of the switch element layer.

7. A method as claimed in claim 6, wherein the nitride layer has a thickness of between 0.1 and 0.4 μm.

8. A method as claimed in claim 1, wherein the switch element layer is doped polysilicon which is formed by deposition.

9. A method as claimed in claim 8, wherein the thickness of the switch element layer is between 0.5 and 2 μm.

10. A method as claimed in claim 1, wherein the outline of the switch element is defined photolithographically.

11. A method as claimed in claim 6, wherein the switch element is formed by etching the switch element layer selectively to the nitride layer.

12. A method as claimed in claim 11, wherein the switch element layer is etched using a plasma etch.

13. A method as claimed in claim 11, wherein a further nitride layer is deposited following the step of etching the switch element layer.

14. A method as claimed in claim 13, wherein the further nitride layer has a thickness of between 0.1 and 0.3 μm.

15. A method as claimed in claim 13, further comprising the step of forming a layer of metal on that portion of the further nitride layer which covers the switch element.

16. A method as claimed in claim 15, further comprising the step of forming a passivating layer over the layer of metal.

17. A method as claimed in claim 1, wherein the outline of the window is formed photolithographically on the passivating layer.

18. A method as claimed in claim 17, wherein the passivating layer is etched, through the window, using a buffered HF etchant.

19. A method as claimed in claim 18, wherein both nitride layers are etched, using the etched passivating layer as a mask, using orthophosphoric acid as the etchant.

20. A method as claimed in claim 17, wherein the passivating layer and both the nitride layers are etched, through the window, by a single plasma etching step.

21. A method as claimed in claim 20, wherein the plasma etching step uses $CHF_3$ as the etchant.

22. A method as claimed in claim 18, further comprising the step of forming a further layer of metal over part of the passivating layer and part of the first sacrificial layer, the further layer of metal being formed prior to etching the passivating layer.

23. A method as claimed in claim 22, wherein the further layer of material is formed by electroplating and has a thickness of between 3 and μm.

24. A method as claimed in claim 1 wherein the second sacrificial layer is etched using ethylene diamine pyrocatechol as the etchant.

25. A method as claimed in claim 1, wherein the first sacrificial layer is etched using a buffered HF etchant.

26. A method as claimed in claim 1, further comprising the step of forming one or more electrodes in the substrate prior to the formation of the first sacrificial layer.

27. A micromechanical switch made by the method of claim 1 and having dimensions greater than 300 μm.

28. A method of forming an operating cavity under a mechanically movable beam in a micromechanical switch, said method comprising the steps of:
    etching an aperture in a first sacrificial layer under said beam to expose a second sacrificial layer thereby defining the lateral extent of said cavity; and
    etching said second sacrificial layer through said aperture to define the depth of said cavity.

29. A micromechanical switch having a switch operating element of dimension greater than 300 μm disposed over a cavity formed in accordance with the method of claim 28.

* * * * *